United States Patent Office 3,303,420
Patented Feb. 7, 1967

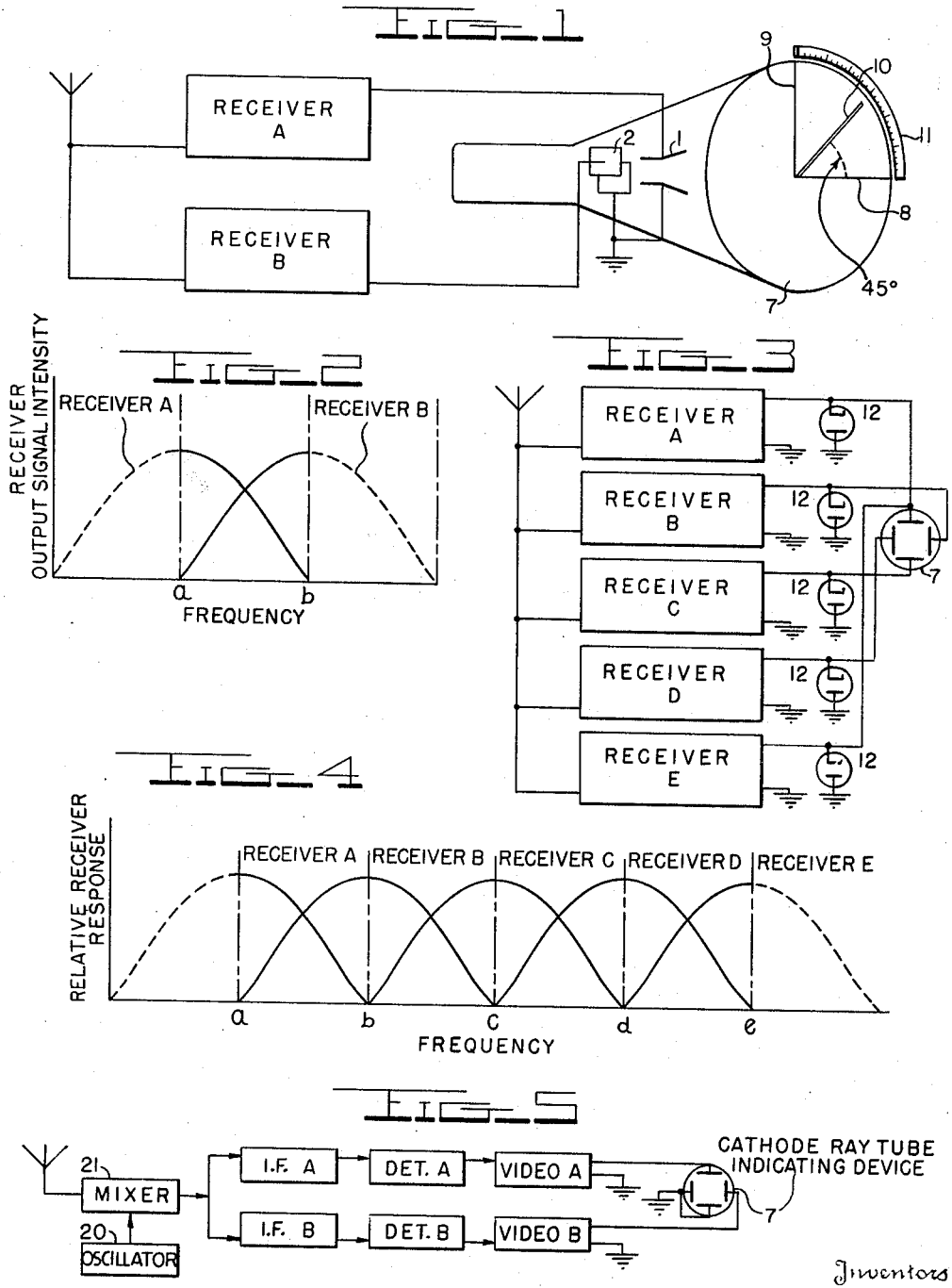

3,303,420
INSTANTANEOUS FREQUENCY RESOLVER
Frederick Harris, 6215 Hope Drive, Washington, D.C.
20031, and Mack J. Sheets, Alexandria, Va.
Filed Dec. 9, 1947, Ser. No. 790,584
1 Claim. (Cl. 324—77)

In general this invention relates to frequency monitoring systems and in particular to a frequency band resolver.

In the known art for the resolution of signals of unknown frequency, the desired frequency spectra is scanned by mechanical or electronic means. One of the disadvantages of such systems is in the failure to detect signals occurring for brief periods after long quiescense. A further disadvantage rests in the resolution of signals occurring in synchronism with the rate of receiver scan. In either case, when a signal of any given frequency occurs in time at an instant when the detecting apparatus is tuned to a frequency greater than the receiver bandwidth away from the occurring signal, it is not detected, hence not identified in frequency, and is lost to the receiving equipment.

In general it is contemplated by the present invention to provide a means for monitoring a suitable frequency spectrum, and to instantly resolve received signals according to frequency. This system is devised as a continuous means for covering an entire spectrum, applying the received signals to quadrature deflecting plates of a cathode ray tube indicator to thereby produce a visual presentation of the monitored signals with their frequencies resolved and to be read directly from the cathode ray tube indicator.

In operation of the system of frequency monitoring, as will be later explained in detail, a plurality of receivers are employed, tuned to individually cover their respective portion of a given spectrum, whereby collectively the entire spectrum is constantly monitored.

Accordingly, an object of this invention is to provide a new system for frequency monitoring to detect and resolve according to frequency a radio frequency signal.

A further object of this invention is to provide a new system for frequency monitoring to detect and resolve according to frequency each of a plurality of repetitive (or non-repetitive) radio frequency signals occurring at diverse repetition frequencies.

Another object of this invention is to provide a new system for frequency monitoring for visually indicating a signal detected and resolved according to frequency.

Further objects and attainments will become apparent upon careful consideration of the following detailed description of the invention, when read in conjunction with the accompanying drawings, in which:

FIG. 1 is a block diagram illustrating one typical embodiment of the invention;

FIG. 2 illustrates the frequency response curves taken to represent the response characteristics of receivers A and B illustrated in FIG. 1;

FIG. 3 is a block diagram illustrating a further embodiment of the invention, employing five receivers;

FIG. 4 illustrates the frequency response curves of the receivers employed in the embodiment shown in FIG. 3, and FIG. 5 is a block diagram illustrating another embodiment of the invention employing superheterodyne principles and separate intermediate frequency and detection channels.

Referring in more particular now to FIG. 1, the embodiment herein exemplified, comprises a pair of radio receivers A and B with their outputs connected to the quadrature deflecting elements of a cathode ray tube indicating device 7. The output from receiver A is coupled to the vertical deflecting plate 1 of the indicating device 7 to cause a vertical deflection of the beam in accordance with the signal output from receiver A and the output from receiver B is coupled to the horizontal deflecting plate 2 of the indicating device 7 to cause a horizontal deflection of the beam in accordance with the output signal strength from receiver B. The receivers possess approximately the same band-pass and amplification characteristics. The receiver output versus frequency is illustrated in FIG. 2. In the preferred case these band-pass characteristics should approach a sine function.

In operation the receivers are tuned so that their outputs, with respect to frequency, overlap in such a manner that at a frequency where the output from one receiver is at a maximum, the output from the other receiver is near a minimum, as shown by the response curve for the system in FIG. 2. The area under the curve between frequencies $a$ and $b$ represents the effective range of the combination. It will be apparent, however, that while signals received in the range outside these frequencies are not frequency resolved by the invention, they are detected and their presence is indicated in a manner more fully described hereinafter.

The indicating device 7 as shown in FIG. 1 comprises a conventional cathode ray type tube, the beam generating and centering circuit have been omitted for purposes of clarification. A conventional balanced centering circuit may be employed with the final accelerating electrode operated at ground potential. In this regard it must be understood that any suitable type goniometric device might be employed in place of the cathode ray tube indicator. As indicated, horizontal and vertical components of the sweep potential are derived respectively from the output signal produced by receivers B and A. Accordingly an incoming signal occurring within the frequency limits $a$ and $b$ of FIG. 2 of the combination will produce an output from both receivers simultaneously. The magnitude of each output is a function of the frequency of the received signal and their vector sum appears as a radial line on the cathode ray tube. The angular position of the line indicates the frequency of the received signal. Thus by choosing receivers whose pass-band characteristics are such as to produce an output signal whose amplitude varies as a sine function of frequency, the angle of the radial line indication will be directly proportional to the frequency. In the case of pulsed signals, the radial line will be brighter at its extreme ends due to the flat-top of the pulse signal. This feature of course provides an indication of the modulation characteristics of the received signal.

Referring again to FIG. 2, a received signal situated in frequency at point $a$ will appear as a vertical line 9, FIG. 1, on the cathode ray indicating device, there being no component of horizontal deflection potential from the output of receiver B. Similarly, a signal occurring at frequency $b$ will be represented as a horizontal line 8, there being no vertical deflection potential component from receiver A. Signals lying between frequencies $a$ and $b$, will appear as radial lines situated intermediately between horizontal and vertical positions on the indicating device 7 of FIG. 1. It will be noted that a signal whose frequency corresponds to the cross over frequency of the two receivers will produce equal output components from the receivers and a radial line at 45°, illustrated at 10 in FIG. 1, will result. For convenience of reading frequency directly from the cathode ray tube indicator device, a calibrated scale illustrated at 11 of FIG. 1 showing frequency in terms of angular position may be attached to the cathode ray tube.

To obtain a greater frequency coverage than the system of FIG. 1 offers, additional receivers may be added as is illustrated in FIG. 3, to which reference is now had. FIG. 3 shows a block diagram employing three additional receivers C, D and E. As previously discussed in relation to the embodiment in FIG. 1, the receivers should have approximately the same bandwidths and amplification characteristics, although the calibrated frequency scale mounted on the indicating device can compensate to a certain extent for variations in bandwidths and signal gain characteristics as between the several receivers. In this embodiment the mid-frequency of each successive receiver is tuned to a value such as one half bandwidth higher than the preceding receiver as shown in the response curve, FIG. 4.

A maximum of five receivers with four frequency cross over points can be indicated on a single conventional cathode ray type tube, but it is to be understood that specially designed cathode ray type tubes, having any number of plates proportional to the number of receivers desired in the system, may be employed. As each signal represents an alternating potential when connected to the deflecting elements of the cathode ray tube, the indication produced thereby will be on either side of a center position, rendering spurious traces or radial lines. To avoid this condition and to produce an indication in one quadrant only, the output of each receiver must be reduced to a varying direct potential, rather than an alternating potential. To this end a clamping means is utilized, as shown in FIG. 3. Clamping diode tubes 12, permit the connection of the positive components of signals from receivers A through E, to the indicating tube deflecting means and shunt negative components, directly to ground. In this manner beam deflection produced by each receiver will be confined to single quadrant without "overshoot" and prevent the output from any pair of receivers from appearing in more than a single quadrant. For similar reasons it may be advisable to employ clamping devices in the embodiment of FIG. 1. Alternately, separate indicating devices can be used for each pair of receivers, and as many receivers as necessary to cover the desired range can be employed.

Reference will now be had to FIG. 5 showing a further embodiment of the invention, to which the superheterodyne principle is utilized, and the output from a common mixer stage 21 is connected to separate wideband intremediate frequency, detection, and video channels A and B as indicated. The intermediate frequency channels A and B are tuned one half bandwidth apart in a manner similar to that described in conjunction with the receivers in FIG. 1. With the oscillator 20 tuned to a desired frequency, the respective channels will respond to signals whose sum or difference with that of oscillator, when mixed in mixer 21, is equal to that of the intermediate frequency. These received signals are then resolved in a manner in accordance with the previously described embodiments with the outputs of the individual channels A and B connected to quadrature deflecting elements of a suitable cathode ray indicator. The system illustrated in conjunction with FIG. 5 may be increased to five separate channels with a single oscillator and mixer to increase the frequency spectrum desired to be resolved, as also previously described in conjunction with FIG. 3.

Although we have shown and described only certain and specific embodiments of the present invention it must be understood that we are fully aware that many modifications are possible thereof without departing from the true spirit of the disclosure.

The invention described herein may be manufactured and used by or for the Government of the United States of America for governmental purposes without the payment of any royalties thereon or therefor.

What is claimed is:

In a frequency analyzing system, a plurality of three or more similar band pass channels, each successive channel tuned to a respective one of successive center frequencies substantially one bandwidth apart, means for applying a signal in parallel to all of said band pass channels, an indicating device including a cathode ray tube having a pluraltiy of deflecting elements successively angularly disposed about the cathode ray beam, and means connecting the output from each of said band pass channels solely to one respective deflecting element of said indicating device, the successive band pass channels being connected to successive angularly adjacent deflecting elements.

References Cited by the Examiner

UNITED STATES PATENTS

| | | | |
|---|---|---|---|
| 2,130,485 | 9/1938 | Feldman et al. | |
| 2,189,300 | 2/1940 | Roberts. | |
| 2,366,628 | 1/1945 | Koch | 324—82 X |
| 2,434,914 | 1/1948 | Earp | 324—82 |
| 2,434,945 | 1/1948 | Mason. | |
| 2,457,136 | 12/1948 | Earp | 324—82 |
| 2,470,731 | 5/1949 | Sziklai. | |
| 2,481,247 | 9/1949 | Schott | 324—81 |
| 2,528,187 | 10/1950 | Sziklai et al. | |
| 2,541,067 | 2/1951 | Jaynes | 324—82 |

WALTER L. CARLSON, *Primary Examiner.*

WILLIAM GIDDES, NORMAN H. EVANS,
*Examiners.*

L. N. DAVIS, P. F. WILLE, *Assistant Examiners.*